United States Patent [19] [11] 3,894,364
Korn et al. [45] July 15, 1975

[54] METHOD OF CLEANING NUCLEAR POWER PLANTS

[75] Inventors: Roland Korn, Nurnberg; Gunter Seyd; Uwe Paulsen, both of Erlangen, all of Germany

[73] Assignee: Siemens Aktiengesellschaft, Munich, Germany

[22] Filed: Dec. 3, 1973

[21] Appl. No.: 420,793

[30] Foreign Application Priority Data
Dec. 4, 1972 Germany............................ 2259345

[52] U.S. Cl. ................................................ 51/320
[51] Int. Cl. ............................................. B24c 1/00
[58] Field of Search ............................. 51/319–321, 51/290, 292, 8 R, 325

[56] References Cited
UNITED STATES PATENTS

| | | | |
|---|---|---|---|
| 2,665,118 | 1/1954 | Broman | 51/8 R UX |
| 2,948,092 | 8/1960 | Fuller | 51/320 X |
| 3,097,450 | 7/1963 | Freeman | 51/319 X |
| 3,286,406 | 11/1966 | Ashworth | 51/319 X |
| 3,299,459 | 1/1967 | McCune | 51/8 R X |
| 3,778,938 | 12/1973 | Korn | 51/320 |

*Primary Examiner*—Donald G. Kelly
*Attorney, Agent, or Firm*—Herbert L. Lerner

[57] ABSTRACT

Cleaning of components of nuclear reactor power plants as for example steam generators, by blasting the contaminated surface with boron trioxide sand propelled by compressed gas, withdrawing the gas containing suspended boron trioxide particles and abraded solid particles from the atmosphere around the treating area and passing the gas containing suspended particles through a vortex separator to separate the particles from the gas. The gas after removal of the particles may be returned to the chamber enclosing the surfaces to be cleaned thereby minimizing contamination in the area surrounding the enclosed chamber.

4 Claims, 1 Drawing Figure

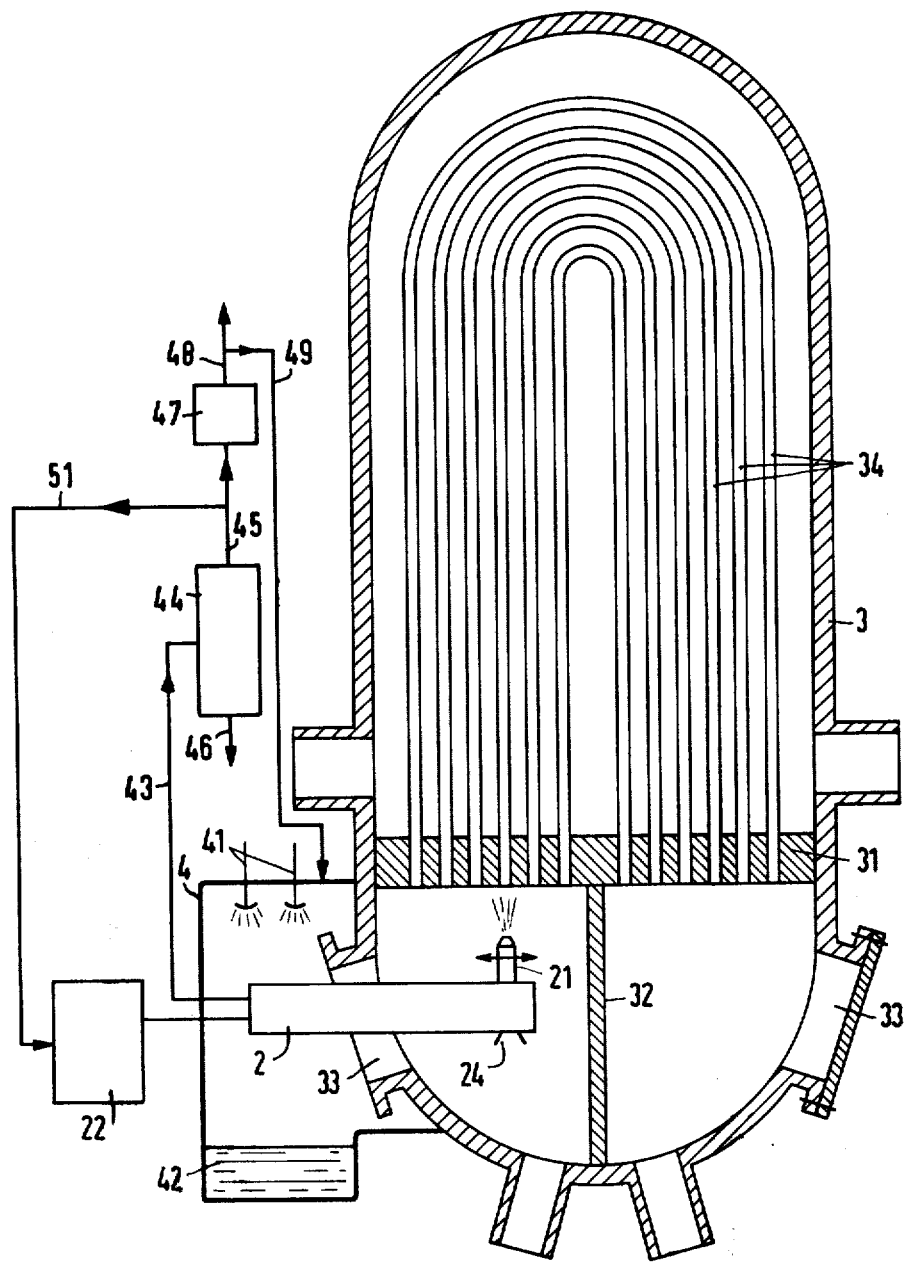

METHOD OF CLEANING NUCLEAR POWER PLANTS

In our co-pending application Ser. No. 223,471, filed Feb. 4, 1972, now U.S. Pat. No. 3,778,938, issued Dec. 18, 1973, we described a method for cleaning components of nuclear reactor power plants which have been wetted during the operation with $H_2O$ or $D_2O$, particularly for the decontamination of radio active contaminated regions. Cleaning is accomplished by sand blasting technique in which boron trioxide particles are propelled through a jet by compressed gas against the surfaces to be cleaned down to the passivation layer of the original material. Some of the boron trioxide particles remain on the clean surface and may be dissolved by flush water and removed. Most of the boron trioxide sand after impingement against the surfaces to be cleaned is carried off by the propellant gas together with abraded particles forming an atmosphere in the cleaning area of gas containing suspended particles of boron trioxide and abraded solid particles. Unfortunately a very appreciable portion of the particles settle from the gas and deposit on the bottom of the zone or container surrounding the surfaces to be cleaned. Special provisions must be made for removal of the particles trapped at the bottom of the surrounding receptical. The gas which contains the remainder of the particles suspended therein are withdrawn from the area of treatment. To avoid contamination of the air outside the enclosure around the surfaces to be cleaned it is necessary to remove the dust-like particles of which some have radio activity. Generally this is accomplished by passing the gas containing suspended particles through a plurality of filters connected in series which is not only cumbersome but also expensive and occupies a relatively large space.

It is accordingly an object of the invention to provide a simpler more efficient method of separating the particles from the gas withdrawn from the enclosure surrounding the cleaning area. Another object of the present invention is to provide a method for minimizing deposition of solid particles from the gas in the area surrounding the cleaning surfaces. A further object of the invention is to provide a method for minimizing contamination of the air outside the enclosure surrounding the cleaning area.

With the foregoing and other objects in view, there is provided, in a process for cleaning components of nuclear reactor power plants which have been wetted during the operation with $H_2O$ or $D_2O$, particularly for the decontamination of radio-actively contaminated regions, by mechanically abrading the surfaces to be cleaned down to the passivation layer of the base material by means of boron trioxide particles with the aid of compressed gas, producing an atmosphere around the said regions of gas having suspended therein boron trioxide particles and solid particles abraded from the surfaces, the improvement which includes withdrawing the gas containing suspended boron trioxide particles and abraded solid particles from the regions, passing the gas containing suspended particles through a vortex separator to effect separation of the particles from the gas, discharging the separated particles and discharging the gas from the vortex separator after separation of the particles.

In a preferred embodiment suction is applied to accelerate the withdrawing of the gas containing suspended boron trioxide particles and abraded solid particles at a rate sufficient to retain at least a major portion of the particles suspended in the gas thereby restricting deposition to no more than a minor portion of the particles in said regions.

Contamination of the air around the enclosed chamber surrounding the cleaning area may be avoided by returning the gas from the vortex separator after separation of the particles to the enclosed chamber. Gas from the vortex separator after separation of the particles may be compressed and utilized to propel the boron trioxide sand to mechanically abrade the surfaces to be cleaned.

Other features which are considered as characteristic for the invention are set forth in the appended claims.

Although the invention is illustrated and described herein as embodied in a method of cleaning nuclear power plants, it is nevertheless not intended to be limited to the details shown, since various modifications and structural changes may be made therein without departing from the spirit of the invention and within the scope and range of equivalents of the claims.

Components of nuclear reactor power plants which have been wetted during the operation with $H_2O$ or, as the case may be, with $D_2O$, require decontamination of radioactively contaminated regions. The primary circulation apparatus of water-cooled nuclear reactors, and also those that are cooled with heavy water, outside of the actual reactor container proper, are composed of pipe conduits, steam generators, condensers, pumps and similar installations, which are normally made of steel. It is unavoidable that, in such a plant, in the course of time, a sediment is deposited on the inner walls of these components, which may be composed of radioactive and inactive corrosion products of the component materials, as well as of radioactive fission products derived from defective fuel elements. The radioactivity of these layers may, in the course of time, become so large that, whenever repairs become necessary, work in their vicinity is only possible over a short period or not at all, due to radiation. Thus, normally a longer operating interruption of the nuclear reactor must be provided for, until the radioactivity of the components which are to be repaired, for instance a pump or a steam generator, has decayed to such an extent that endangerment of the working personnel is no longer present.

Such long periods of interruption, however, are completely intolerable for the economic operation of a nuclear power plant. The usual decontamination techniques with the aid of acids and pickles, however, are impossible in connection with fixedly builtin power plant components, since the possible transport of such treatment media into other portions of the plant may lead to further inestimable damage. The task arose, therefore, with conscious departure from such known methods and techniques, to find a decontamination method which may be put in operation, immediatly following the shut-down of the power plant, and thereby permitting the carrying through of the necessary repairs, as well as the start-up of the plant in the shortest possible time. It also becomes necessary to avoid with absolute certainty any injurious effects of such methods on other nuclear reactor components. The method further called also for such a safety factor that, in the case of any faulty operation, absolute certainty was provided that damage to the base material and to the surfaces of the components to be cleaned, could not take place. In addition it is important to prevent contamination of the air outside the cleaning area by emission of radio active particles.

Sand-blast technique, boron trioxide particles with the aid of a compressed jet are used for the mechanical working off of the surfaces to be cleaned down to the passivation layer of the base material. The remainder of the jet blast material may be dissolved and then removed by water flush. This is a modified sand blasting technique wherein, instead of the quartz with a Mohs hardness of 7, boron trioxide ($B_2O_3$) is used with a Mohs hardness of 5 to 6. This material, accordingly, is considerably softer than quartz, and its hardness is of the order of magnitude corresponding to that of the deposits on the components which are to be removed, which essentially are comprised of coherent layers of magnetite-like character. Thus, the first oxidation layer on the base material, due to the absence of other foreign matter deposits, is substantially harder than the overlying layers.

This basic layer has the task to protect the base material from further corrosion, and is defined herewith also as a passivation layer. Injury to this layer due to decontamination would therefore expose the base material to a further corrosion attack, which, if possible, should be prevented. Since the jet blast material used, that is, boron trioxide, is somewhat softer than this passivation layer, this does not result in any further attack thereon. Independent of the period of treatment and the speed of the boron trioxide particles, this passivation layer therefore remains preserved so that an inherent safety is contained in this treatment process. The boron trioxide, furthermore, has the great advantage that it is easily water-soluble, so that, by means of flushing, it may be recovered from the cleaned components.

Although the boron trioxide sand, which coomes in various grain sizes, may be considered hygroscopic, the life, however, of containers with this blasting material, which have been opened, will definitely last through several days without precautions. For the purpose of handling this material, therefore, no special hygroscopic protection is necessary, so that carrying out of the process then becomes relatively uncomplicated.

Apart from these advantages, the method in accordance with the invention, vix-a-vis the known acid-pickling processes, has the further great advantage that it may be used with far greater target precision. That is to say, predetermined surface portions, including those of small dimensions of only a few square centimeters, as well as all of the surfaces of nuclear reactor components, may be decontaminated.

The method of operation of the invention, however, together with additional objects and advantages thereof, will be best understood from the following description of specific embodiments when read in connection with the accompanying drawing, which diagrammatically illustrates the present invention.

For a further explanation, reference is made to the FIGURE in which an exemplified case has been shown schematically. In the case shown, the cleaning of the pipe sheet of a steam generator in a nuclear power plant has been exemplified. This cleaning is necessary since, for instance, one or more heat exchanger pipes 34 will have become leaky. It is therefore necessary to lock them into a pipe sheet 31, which, however, is only possible after a decontamination of its surface. The blast arrangement 2 is accordingly introduced through a manhole 33 of a chamber of the boiler 3. The jet nozzle 21 is here led back and forth in accordance with a coordinate guiding system along the surface of the pipe sheet 31, the compressed gas being supplied in a known manner, for instance, from a compressor 22. The storage container for the boron trioxide sand is, for the purposes of clarity, not further illustrated. The grain size of the blast material, for example, may comprise 150 $\mu$, and the gas pressure 6 atmospheres. Within one minute, approximately 500 g are blasted out and thereby a surface of about 100 to 200 $cm^2$ will have been cleaned.

The compressed air carrying boron trioxide sand passing through jet 21 impinges against the contaminated surfaces thereby abrading the surfaces to produce abraded particles and the spent gas forms an atmosphere in the chamber of boiler 3 in which boron trifluoride particles and abraded solid particles are suspended in the gas. In connection therewith, it is of advantage, during the blasting process, to protect the adjacent surroundings of the heat exchangers to be treated, from the boron trioxide dust, and also against radio active impurities contained therein. This may be obtained by means of screening 4, for instance, a plastic foil, it of course being understood that the compressed air introduced into the steam generator will again have to be removed through an exhaust aperture 24. The compressed air containing entrained boron trioxide particles and abraded solid particles is then exhausted through line 43. There is a tendency for the boron trioxide particles and the abraded solid particles suspended in the gas to settle and deposit on the bottom of the chamber as well as enclosure 4. To counteract this settling and deposition effect, suction is applied to accelerate withdrawing of the gas containing suspended boron trioxide particles and abraded solid particles at a sufficiently high rate to retain at least a major portion of the particles suspended in the gas, preferably in excess of 90% of the particles in the gas, thereby limiting deposition of the solid particles to no more than a minor portion of the particles originally suspended in the gas. If sufficient suction is applied, little deposition of the solid particles in the enclosure will occur with the result that under certain circumstances it may be unnecessary to rinse the vessel to remove solid particles. If desired, after carrying through the decontamination, water is flushed over the treated surface and thereby remainders of the boron trioxide thereon are dissolved out. It may be further advantageous to effect, within this working space, by means of fogging nozzle 41, a strong humidification of the room atmosphere and to thereby precipitate the boron trioxide dust particles, as well as particles of the abraded layers and to collect them in a container 42.

The gas containing suspended solids are introduced into vortex separator 44 wherein the solids are separated from the gases and discharged through line 46 and the gas, free from solids, is released through line 45. Vortex separators are known and operate on the principle involving so-called "relative forces" in flowing media subjected to a rotational flow having a potential-flow component and a circulatory-flow component and resulting in a vortex source and sink formation within the separator vessel. The physical principles of this type of separation and the forces resulting from the just-mentioned flow phenomena are explained and illustrated in U.S. Pat. Nos. 3,199,268; 3,199,269;

3,199,270; 3,199,271; 3,199,272 and 3,396,511. By this means there is effected more efficient separation of the dust from the gas in a more compact space. A suitable suction pump or fan-blower 47 is provided to withdraw the gas containing suspended solids from the chamber of boiler 3 through orifice 24 at a sufficiently high rate to prevent material settling and deposition of the solids from the gas. The gases from suction pump 47 are then discharged through line 48. To avoid any possibility that fine particles of dust or radio active dust may contaminate the surrounding air, the gas discharging through line 48 may be returned via line 49 up to the enclosure thereby avoiding any possibility of contamination of the surrounding air. If desired, the gas from vortex 44 released via line 45 may be directed through line 51 to the suction side of compressor 22 where the gas is compressed and employed as a compressed gas to propel the boron trioxide particles through jet 21.

Normally, for the blast installation, the use of a nozzle is sufficient, such as is known from sandblasting technology. If, however, especially small surfaces are to be decontaminated, as specific targets, for instance, unfavorably situated surface forms have to be reached, it is appropriately useful to throw the blasting material on to the respective surfaces with the smallest possible scatter, as by a nearly parallel jet. This may be attained through the use of the Laval-like formation of the blast nozzle, as well as by a correspondingly suitable grain size of the blasting material. Through such a nozzle form, it also becomes possible to increase the velocity of the blasting material, which is the same as an increase of the effectiveness thereof, without, however, attacking the passivation layer of the base material.

It is, of course, understood that, in the example here illustrated, after the decontamination of the one chamber, the other chamber, which is separated therefrom through a partition 32, is treated through a second manhole 33. After carrying out the flushing steps mentioned above, the chambers may be entered and the work of sealing the defective pipes 34 may then take place. After a concluding pressure test of the steam generator thus repaired, the generator may again be connected to the reactor circulatory system, so that the time periods for the repair work practically become the equivalent of the at-rest periods of the power plant. Waiting for the decay of the radioactivity, therefore, becomes unnecessary.

Obviously, similar working operations may be applied to other reactor components, such as pipe conduits, pumps, etc. This method, of course, is also suitable for the normal cleaning operations on non-contaminated surfaces, and is, therefore, not limited to components of nuclear reactor installations.

Although the invention is illustrated and described herein as a method for decontamination of surfaces of nuclear reactor components, it is nevertheless not intended to be limited to the details shown, since various modifications and structural changes may be made therein without departing from the spirit of the invention and within the scope and range of equivalents of the claims.

We claim:

1. In a process for cleaning components of nuclear reactor power plants which have been wetted during the operation with $H_2O$ or $D_2O$, particularly for the decontamination of radio-actively contaminated regions by mechanically abrading the surfaces to be cleaned down to the passivation layer of the base material by means of boron trioxide particles with the aid of compressed gas, producing an atmosphere around said regions of said gas having suspended therein boron trioxide particles and solid particles abraded from said surfaces, the improvement which comprises withdrawing said gas containing suspended boron trioxide particles and abraded solid particles from said regions, passing said gas containing suspended particles through a vortex separator to effect separation of the particles from the gas, discharging the separated particles and discharging the gas from the vortex separator after separation of the particles.

2. Process in accordance with claim 1 wherein suction is applied to accelerate said withdrawing of said gas containing suspended boron trioxide particles and abraded solid particles at a rate sufficient to retain at least a major portion of the particles suspended in the gas thereby restricting deposition to no more than a minor portion of the particles in said regions.

3. Process in accordance with claim 1 wherein the cleaning area is in an enclosed chamber and wherein said gas from the vortex separator after separation of the particles is recycled to said enclosed chamber.

4. Process in accordance with claim 1 wherein said gas from the vortex separator after separation of the particles is compressed and employed as said compressed gas to propel said boron trioxide particles to mechanically abrade the surfaces to be cleaned.

* * * * *